United States Patent [19]
Selke

[11] 3,959,923
[45] June 1, 1976

[54] EQUIPMENT FOR GROWING ALGAE

[75] Inventor: Winfried Selke, Bremen, Germany

[73] Assignee: ERNO Raumfahrttechnik GmbH, Bremen, Germany

[22] Filed: Dec. 4, 1974

[21] Appl. No.: 529,453

[52] U.S. Cl. .............................. 47/1.4; 47/DIG. 6
[51] Int. Cl.² ..................................... A01G 33/00
[58] Field of Search .................. 47/1.4, 1.2, DIG. 6

[56] References Cited
UNITED STATES PATENTS

| | | | |
|---|---|---|---|
| 2,658,310 | 11/1953 | Cook | 47/1.4 |
| 2,715,795 | 8/1955 | Pallotta et al. | 47/1.4 |
| 2,732,662 | 1/1956 | Myers et al. | 47/1.4 |
| 2,732,663 | 1/1956 | Dewey | 47/1.4 |
| 3,218,758 | 11/1965 | Konikoff | 47/1.4 |
| 3,243,918 | 4/1966 | Machiedo | 47/1.4 |
| 3,529,379 | 9/1970 | Ware | 47/1.2 X |

*Primary Examiner*—Robert E. Bagwill
*Attorney, Agent, or Firm*—Ralf H. Siegemund

[57] ABSTRACT

Water with algae and nutrients follow a meandering flow path, across which are established alternating, wide, dark and narrow, illuminating zones.

10 Claims, 3 Drawing Figures

EQUIPMENT FOR GROWING ALGAE

BACKGROUND OF THE INVENTION

The present invention relates to equipment for growing algae, particularly under utilization of artificial light.

It is a known fact that algae contain more than 50% protein and become of increasing interest as a source for food. The growth of the algae depends on the nutrients in the water as well as on the illumination that is available for producing photosynthesis.

Nutrients for algae are developed e.g. as oxidation products in waste water and sewage treatment plants operating with aeration. Algae take up these oxydation products, and the water is softened as well as disinfected. Thus, utilization of algae for purposes of water purification is a viable alternative for chemical removal of oxidation products. Water purified by algae can readily be recycled into the water supply.

Many parts of the world, particularly in higher latitudes with prevailing unfavorable weather conditions do not offer sufficient natural light to permit cleaning and clearing of water by means of growing algae. Instead, artificial light is needed at least as a supplement. Generally speaking, photochemical effectiveness of light increases with its intensity within a certain range, while for higher intensities one approaches a saturation level so that further increases in light intensity do not produce any gain in photochemical effectiveness. However, it is known that intermittent illumination for higher intensities is rather advantageous.

DESCRIPTION OF THE INVENTION

It is an object of the present invention to provide equipment for growing algae particularly under utilization of artificial illumination.

In accordance with the preferred embodiment of the present invention, it is suggested to provide a channel or duct for flowing water containing algae and nutrients and which runs alternatingly through illuminated and dark zones. The dark zones will be longer than the illuminated ones, preferably by a factor of ten. In furtherance of the invention, one will provide basically a closed and dark duct, but its boundaries are provided with spaced apart windows through which light is directed towards the duct interior. The light is preferably emitted by artificial light sources and its spectrum should be selected with particular regard to the most favorable conditions for algae photosynthesis.

In the preferred form of practicing the invention, a container is provided with water inlet and outlet and transverse walls for establishing a meandering flow path. The transverse walls or the bottom of the container are provided with spaced apart windows, and plural light sources are provided, one for a plurality of aligned windows with intercepting, but mutually not shading mirrors for directing beams of light respectively through the windows and into the water flowing past the windows. Such a source together with windows and mirrors establishes a light duct, either under the bottom of the container or inside of one of the transverse walls, and the mirrors each branch off a portion of the light from the light source and direct it into the flow of water, algae and nutrients. The spaced apart windows establish the alternation of dark and illuminating zones. The inside of the light ducts is preferably made completely reflective, except for the windows.

The flow path for water should be provided additionally with a flow path for air following the flow path of water and aerating the water throughout.

The equipment for growing algae can serve as a stage in waste water purification plant, following therein an aerobic treatment stage.

The equipment for growing algae following the principles of the invention has considerable advantages in that powerful lamps with high yield operate continuously as the entire equipment can be operated continuously. The length of the flow path and the mean flow velocity are determined so that water stays in the flow path for the required reaction time.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a container 1 having sides 2 and 3 with transversely extending flow redirecting walls 4 to obtain a meandering flow path 5. Reference numeral 6 refers to a water inlet, and water is discharged from the container 1 at outlet 7. Arrows 8 denote the flow and direction of flow of water in that meandering path 5.

Figure 1:
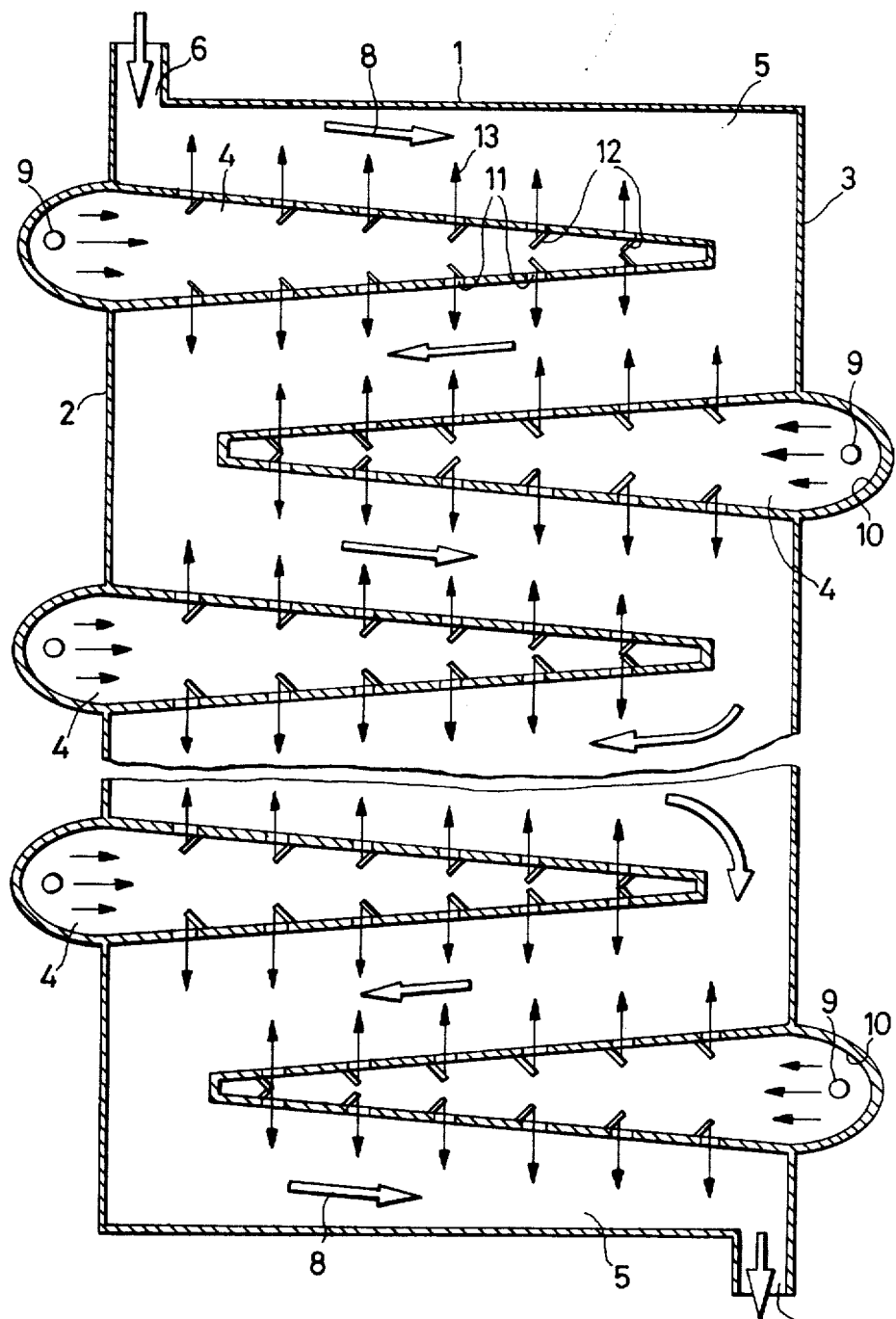
FIG. 1 is an elevation, somewhat schematic, of a duct and illuminating system in accordance with a first example of the preferred embodiment of the invention, showing transverse flow separations constructed as light ducts.

The water entering container 1 at inlet 6 contains already algae and may additionally contain oxidation products as resulting from aerobic treatment of waste water.

In this first example of the preferred embodiment, zones of illumination are established through windows in side wall boundaries of and along the flow path 5. Specifically, the walls 4 are of wedge-shaped hollow construction each having a light source 9 at the wide end which is constructed as parabolic mirror 10. The light source 9 is positioned in the focal point of the respective mirror which emits a beam of parallel light accordingly. The entire interior of each wall 4 should be reflective to obtain maximum yield of the high intensity lamp 9 therein.

The hollow wall has a plurality of spaced windows 11 having dimensions in that the width of each is about one tenth the center to center spacing as between adjacent windows. 45° mirrors 12 are placed next to each window to deflect the portion of light it intercepts and at right angles, through the window and into the adjacent flow duct. The flow duct is, therefore, traversed by a sequence of light beams or bands through which the water passes. One can also say that the spaced apart windows together with illumination on the inside establishes alternating zones of illumination and darkness for the passing algae.

The wedge shape of each wall permits the staggered arrangement of mirrors, so that none of them shades the others, and substantially all eight can be used. The front end of each wall 4 may also be constructed as window and will permit passage of a light beam into the flow as flowing around the wall end.

It can thus be seen that algae and nutrients in the water as entering container 1 at inlet 6 flows alternatingly through relatively wide, dark zones and narrow, brightly illuminated zones. The algae will grow until discharged at 7.

Figure 2:
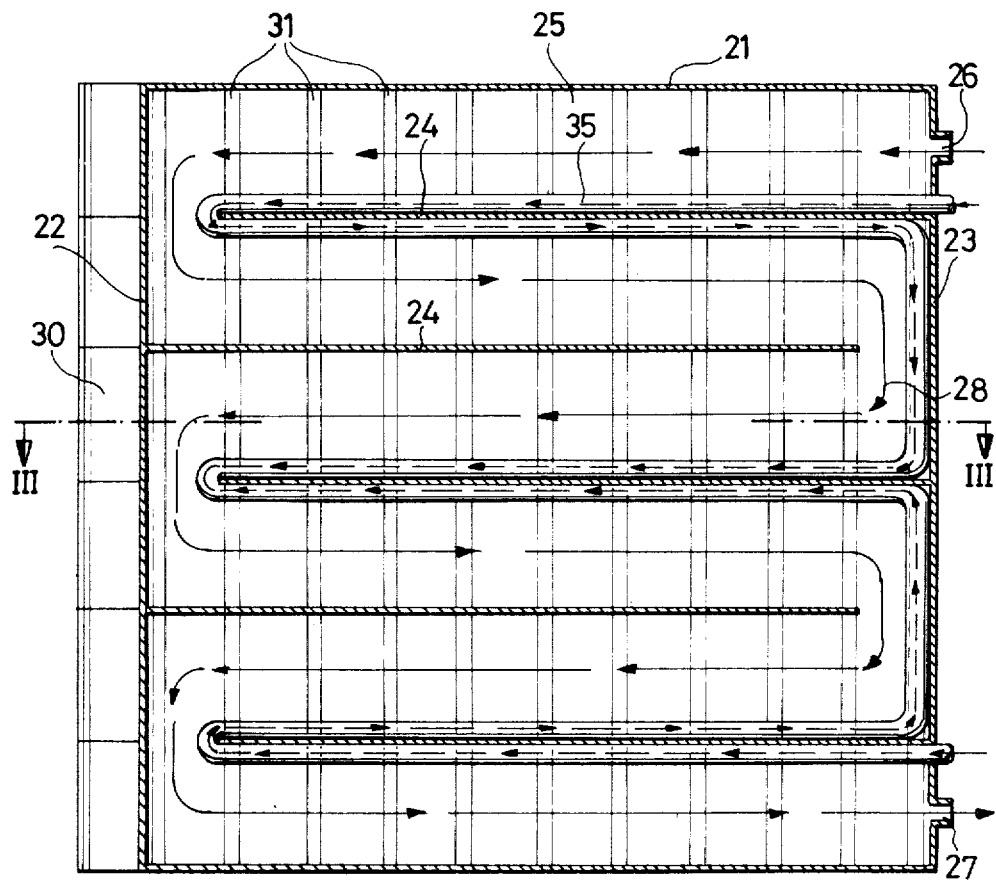
FIG. 2 is an elevation of a second example with light ducts arranged underneath the flow path channel.
Figure 3:
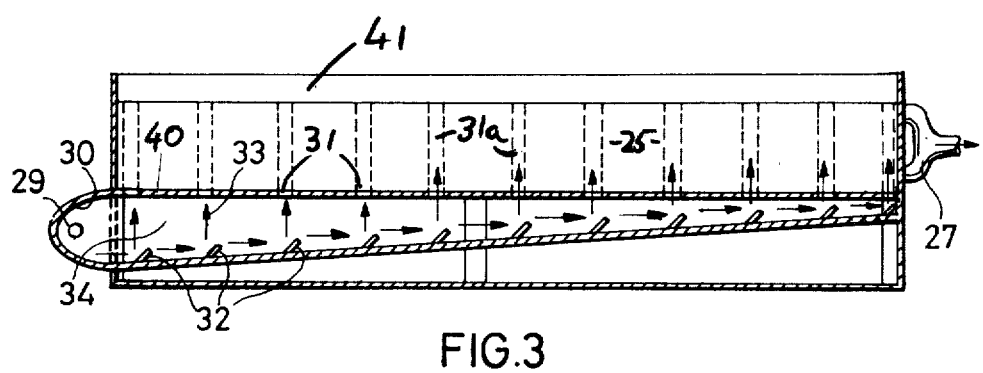
FIG. 3 is a section view taken along lines III—III in FIG. 2.

Turning now to FIGS. 2 and 3, a container 21 has an inlet 26 and an outlet 27 for the water, and a meandering flow duct 25 in container 21 is established by transverse walls 24 connected alternatingly to sides 22 and 23 of the container 21. The bottom 40 of the container is traversed by narrow windows 31, which extend parallel to sides 22 and 23. Therefore, in this example, the illumination zones are established in the bottom 40 of the meandering flow path. Reference numeral 41 denotes the top of the container, which is closed.

Wedge-shaped light ducts 34 are positioned underneath the container having again a wide end constructed as parabolic mirror 30, and a light source 29 is disposed in the focal point.

The top of each light duct is straight, while the bottom is oblique and has intercepting mirrors 32 arranged to direct light in up direction (arrows 31') through the windows 31, which are also windows in the straight portion of the light duct. Narrow light bands or beams 31a are thus emitted into the flow duct 25.

Aerating hoses 35 run on the bottom of the container and along some of the walls 24 and wall 23 to aerate the water as it flows past. This aeration causes additionally movement in and of the water transverse to the main direction of flow in the duct. This water movement prevents precipitation of solids on the walls and particularly on the windows.

The invention is not limited to the embodiments described above, but all changes and modifications thereof not constituting departures from the spirit and scope of the invention are intended to be included.

I claim:

1. Equipment for growing algae comprising, first means defining a flow duct for water containing algae and nutriants for promoting growth of the algae;

second means for establishing in the flow duct distinct zones of photochemically effective illumination alternating with zones of darkness in the flow duct, along and in the direction of flow, so that the water and growing algae therein pass through these zones in corresponding alternating sequence;

said zones of illumination being established from opposite sides of the flow duct in a significant portion of the flow duct; and the zones of darkness being about ten times as long in the direction of flow as the zones of illumination.

2. Equipment as in claim 1, wherein the first means has duct walls and the second means includes a plurality of spaced apart windows in at least one of the duct walls, the water flowing past said windows, the second means including means for directing light through said windows into the flowing water, at least some of the windows being aligned in pairs across said flow duct.

3. Equipment as in claim 2, the means for directing including mirrors adjacent said windows for directing light therethrough.

4. Equipment as in claim 1, wherein the first means includes duct boundaries along which the water flows, and the second means including a plurality of light ducts arranged along the boundaries but outside of the flow duct, each light duct having spaced apart windows, a light duct of the plurality of light ducts having a light source and a plurality of staggeredly arranged mirrors respectively arranged adjacent the windows of the light duct for intercepting a portion of the light from the source of the light duct and passing it through the windows to establish said illumination zones.

5. Equipment as in claim 4, the light duct being on their inside provided for reflection except for the windows.

6. Equipment as in claim 1, the first means including a container with transverse walls extending into the container alternately from opposite sides for establishing a meandering flow duct, the second means including spaced apart windows in the meandering flow duct through which light is directed to establish said illumination zones, at least some of the windows being aligned in pairs across said flow duct.

7. Equipment as in claim 6, the walls being of hollow construction, having said windows, the second means including light sources in the walls and means for directing light from the light sources through the windows.

8. Equipment as in claim 6, the windows being in the bottom of the container, the second means further including light sources and means for directing light from the light sources through the windows.

9. Equipment as in claim 1 and including means for aerating the water as it flows in said duct.

10. Equipment as in claim 1, wherein the illumination zones are established through artificial light sources.

* * * * *